May 2, 1950 B. F. WOBKER ET AL 2,505,851
CATALYST VESSEL
Filed June 11, 1946 3 Sheets-Sheet 1
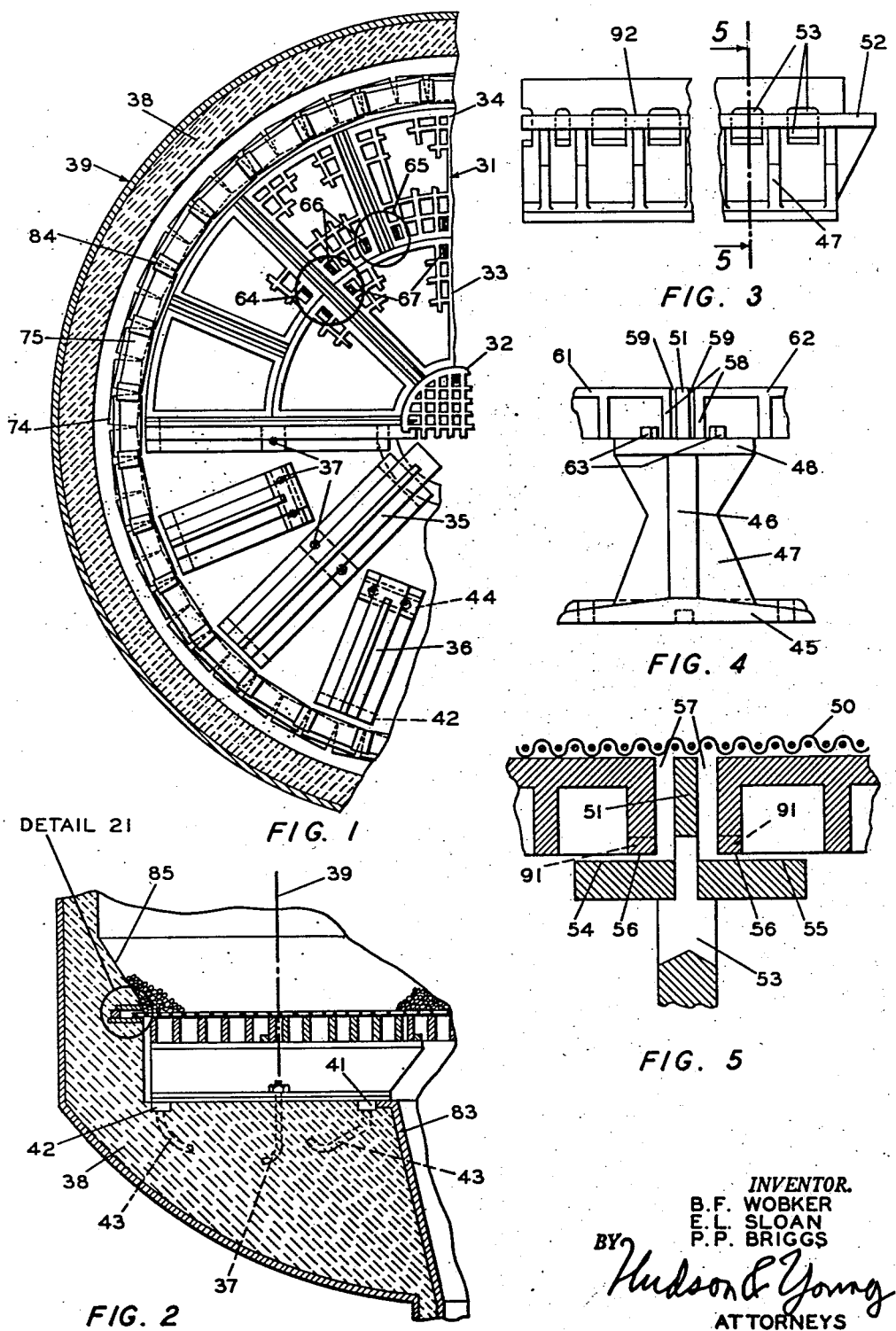
INVENTOR.
B.F. WOBKER
E.L. SLOAN
P.P. BRIGGS
BY Hudson & Young
ATTORNEYS INVENTOR.
B.F. WOBKER
E.L. SLOAN
P.P. BRIGGS
BY Hudson & Young
ATTORNEYS May 2, 1950     B. F. WOBKER ET AL     2,505,851
CATALYST VESSEL Filed June 11, 1946     3 Sheets-Sheet 3

INVENTOR.
B.F. WOBKER
E.L. SLOAN
P.P. BRIGGS
BY Hudson & Young
ATTORNEYS

Patented May 2, 1950

2,505,851

UNITED STATES PATENT OFFICE 2,505,851

CATALYST VESSEL

Burle F. Wobker, Earl L. Sloan, and Preston P. Briggs, Bartlesville, Okla., assignors to Phillips Petroleum Company, a corporation of Delaware Application June 11, 1946, Serial No. 676,080

12 Claims. (Cl. 23—288)

This invention relates to catalyst chambers. In one of its more specific aspects it relates to catalyst chamber catalyst supports. The invention, as specifically disclosed, describes a free floating, expansion absorbing catalyst support assembly for use in catalyst chambers adapted to high temperature processing.

An object of our invention is to provide a catalyst chamber assembly adapted to high temperature service.

Another object of our invention is to provide a catalyst chamber assembly adapted to processing hydrocarbons at high temperature with intermittent combustive regeneration.

Another object of our invention is to provide a catalyst chamber catalyst support adapted to minimize differential expansion during heating and cooling portions of the process cycle, as well as during heating up from atmospheric to process temperature and vice versa.

Still another object of our invention is to provide a catalyst bed supporting assembly which possesses sufficient mechanical strength to support a heavy catalyst load and at the same time is adaptable to absorb excessive expansion and contraction due to such large temperature changes as occur in high temperature hydrocarbon conversion operations.

Yet other objects and advantages will be apparent to those skilled in the art from a careful study of the following disclosure and drawing, which respectively describes and illustrates a preferred form of our invention.

In the drawing, Figure 1 illustrates, in part, a plan view of our catalyst support assembly, with a portion of the grill work removed.

Figure 2 shows a half cross section of our catalyst support assembly.

Figure 3 is a side elevational view, in part, of a supporting beam.

Figure 4 is an end view of the beam shown in Figure 3, and includes a showing of the relative position of adjacent grids and positioning of two expansion control lugs.

Figure 5 is a cross sectional view, in part, of the beam taken on the line 5—5 of Figure 3, and in addition shows a grid-screen-beam assembly detail.

Figure 6:
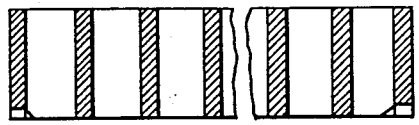
Figure 6 is a cross sectional view, in part, of the center circular grid member, taken on the line 6—6 of Figure 7.
Figure 8:
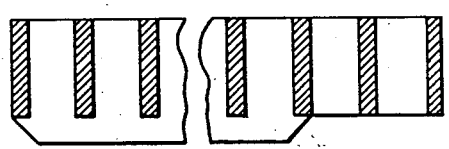
Figure 8 is a radial section of an intermediate grid member taken on the line 8—8 of Figure 11.
Figure 9:
Figure 9 is another radial section of the intermediate grid member taken on the line 9—9 of Figure 11.

Referring now to the drawing, and specifically to Figure 1 which illustrates the assembly of our invention, in plan. A support floor or grid work 31 is composed of a center circular grid member 32, some intermediate grid members 33 and some outer grid members 34. In the embodiment as illustrated in Figure 1, there are eight of the intermediate grid sections, sixteen of the outer grid sections and one central circular grid section. It is obvious, however, that there may be a larger or smaller number of these grid sections as the diameter of a containing vessel may be large or small, and upon the catalyst load to be carried, and upon the thermal conditions to be imposed upon the assembly.

Just below and supporting these grid members are some expansible structural beams, 35 and 36. The beam identified by reference numeral 35 is a longer beam than beam 36, and is shown in side view and end view of Figures 3 and 4. Beams 36 may be, for the most part, similar to beams 35, the differences being, they are shorter in length and possess square ends. As illustrated, these beams are alternately placed, and so placed that the long beams 35 extend from the outer edge of the circle of grid members 34 to a point under the edge of the circular grid member 32. Further, these long beams 35 are so placed as to support the side radial edges of two adjacent outer grid members 34, and the side radial edges of two adjacent intermediate grid members 33; each beam 35, therefore supports radial edges of two pairs of grid members.

The short beams 36 are so placed as to support adjacent radial edges of the outer grid members 34, not supported by the long beams. The short beams 36 also offer intermediate support on the outer circumferential edge of intermediate grid member 33. It may be observed from Figure 1 that the long (35) and short (36) beams are alternately placed.

These beams are rigidly held by some bolts 37. The entire assembly of these bolts 37 form a circle, as may be seen in Figure 1. The bottom or "head" end of the bolts 37 are not necessarily of conventional bolt construction, but may be a rod threaded on one end for taking a nut and the other end bent so as to form a firm bond between the bolt and "insulcrete" cast insulation 38. Other moldable, heat resisting and mechanically strong insulation material may of course be used in place of the mentioned insulcrete.

The ends of the short beams 36 and a midpoint of the long beams 35 are rigidly held in place by these bolts 37, said insulcrete or other insulation 38 having been previously set. One of the main objects of our invention, that is, to minimize expansion is realized in that from the circle of bolts 37 all the short beams 36 expand toward the periphery of the catalyst vessel 39 during heating and contract to their original position during cooling. And, the outer half of each long beam 35, that is, the portion between the circle of bolts 37 and the end adjacent the chamber wall, also expands toward the chamber walls during heating and contracts to its original position during cooling. The opposite end of these long beams 35 expand toward the center of the vessel during the heating and contract toward the bolt circle 37 during cooling. Since the bolts 37 are placed in the center, longitudinally, of the long beams 35, during heating, the actual expansion of the two halves of these beams is equal and opposite, and likewise for contraction during cooling.

The length of the long beam 35 from the circle of bolts 37 to the outer beam end is intended to be equal to the length of the short beam 36 from the circle of bolts 37 to its outer end thus all beam parts outside the circle of bolts 37 expand and contract equally with equal temperature changes.

The long beams 35 are divided into two substantially equal halves, and in the assembly a long beam is opposite a long beam so that there are four equal expansion spaces across the diameter of the chamber taken up by two long beams. A fifth space, not occupied by a beam, is taken up by the center circular grid 32, which latter rests upon the end of each of the eight long beams 35. From these considerations it will be obvious that the maximum movement of any point of the beams 35 and 36 will be approximately one-fifth the movement of a member whose length is equal to the diameter of the vessel.

From another view point, if all beams extended radially from the center of the chamber in a wheel-spoke manner, and assuming the "hub" or center point to be fixed in position, the ends of the spokes or beams would move by expansion about 2½ times the distance of the maximum movement according to our invention.

It is realized then that expansive movement in our assembly has been minimized and equalized in direction. When it is considered that such a grid-beam assembly may be called upon to support many tons of catalyst material, the minimizing of expansive and contractive movement increases markedly the life of the catalyst support assembly.

The beams 35 and 36 while rigidly fixed by the bolts 37 are supported by plates at the ends thereof. The inner end of each long beam 35 is supported by a plate 41 embedded in the insulation 38. The outer ends of all beams 35 and 36 are supported by plates 42 which are also embedded in the insulation 38. In addition to plates 41 and 42 serving as supports for the ends of the beams, they also serve as slide plates upon which the ends of the beams slide during thermal expansion and contraction. These plates are anchored to the insulation by anchor bolts or rods 43 in a manner similar to that used for anchoring bolts 37. The fixed ends of the short beams 36 rest upon bearing plates 44.

On reference to Figures 3, 4 and 5 the design and form of beams 35 and 36 may be visualized. Figure 3 shows a side elevation, in part, of the long beams 35. Figure 4 is an end view of this beam showing a base flange member 45, a longitudinal web 46, cross web members 47, an upper flange member 48 and a top web member 51. The base flange member 45 and the upper flange member 48 are horizontally disposed with the web member 46 therebetween in a sort of an I-beam manner. On top of the upper flange member 48 is an upright top web member. This latter member is intended to be disposed between two of the intermediate or outer grid plates. The height of this member is equal to the thickness of the grid plate so that the upper surface of the grid plates and the upper horizontal surface of this top web member lie in a common horizontal plane, and it is upon this horizontal common plane that a screen member 50, to be described hereinafter, is disposed, see Figure 5.

In the base flange member 45, are bolt holes for the anchor bolts 37.

On reference to Figure 3, it can be seen that the upper flange member 48 at one end extends beyond the base flange member 45 and beyond the top web member 51. The extended surfaces 52 of the several long beams 35 form the supports for the center circular grid member of Figure 7.

Figure 10:
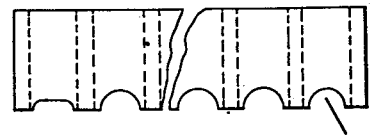
Figure 10 is a side (radial) elevation of the intermediate grid member taken from the line 10—10 of Figure 11.
Figure 11:
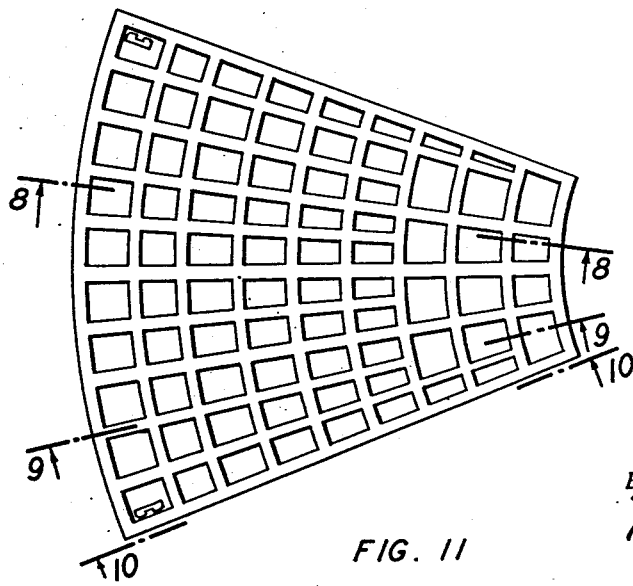
Figure 11 is a plan view of one of the intermediate grid members.
Figure 12:
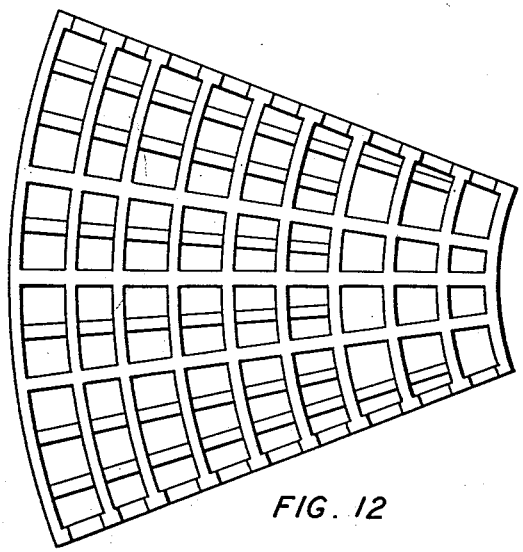
Figure 12 is a bottom view of the intermediate grid member of Figure 11.
Figure 13:
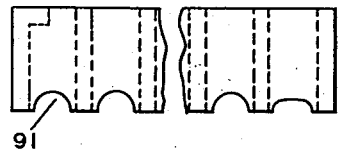
Figure 13 is a side radial elevational view, in part, of an outer grid member taken from the line 13—13 of Figure 15.
Figure 14:
Figure 14 is a radial cross sectional view, in part, of an outer grid member taken on the line 14—14 of Figure 15.
Figure 15:
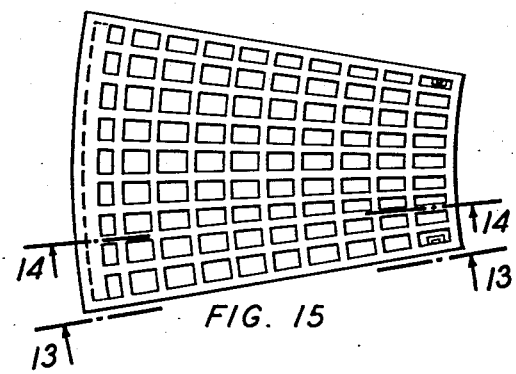
Figure 15 is a plan view, in part, of an outer grid member.
Figure 16:
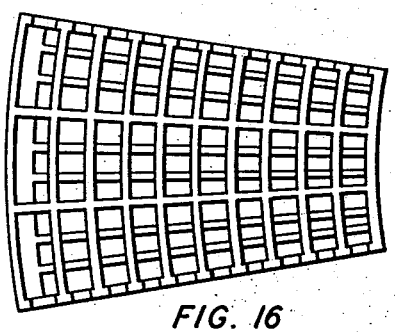
Figure 16 is a bottom view of an outer grid member.

Figure 5 shows a novel feature of the beams 35. As mentioned hereinbefore the upper flange member 48 is divided into two halves 54, and 55, by the top web member 51. On surface 54 there rests the bottom surface 56 of a radial rim of a grid member, as for example one of the intermediate grids 33, as shown in Figure 11 or one of the outer grid members 34 as shown in Figure 1. The radial rims of the inner grids 33 and of the outer grids 34 have small arched openings 91 as shown in Figures 10 and 13. In the assembly, these openings 91 are positioned opposite the cross web members 47 of the beams 35 and 36.

During the course of operation some catalyst degradation takes place with the result that small dust like particles sift through the openings in screen 50. That which sifts through the screen and unobstructed grid openings merely falls to the bottom of the chamber while the catalyst which sifts through the screen into the spaces 57 falls either through openings 53 in the beams to the bottom of the chamber or through the grid rim openings 91 to the outer surface 54 of the flange 48, and thence to the bottom of the chamber. If the openings 53 were not present in the beam such catalyst as falls into the spaces 57 would accumulate therein and occupy the space which should be available for grid expansion.

Referring again to Figure 4, there are shown portions of two grid plates 61 and 62 on opposite sides of the top web member 51, similar in showing to that in Figure 5.

To control the direction of expansion and contraction and to make certain that a grid rim 58 does not slide off the top surface of the upper flange member 48, expansion control lugs 63 are fastened to the upper surface of this flange member 48.

Figure 7:
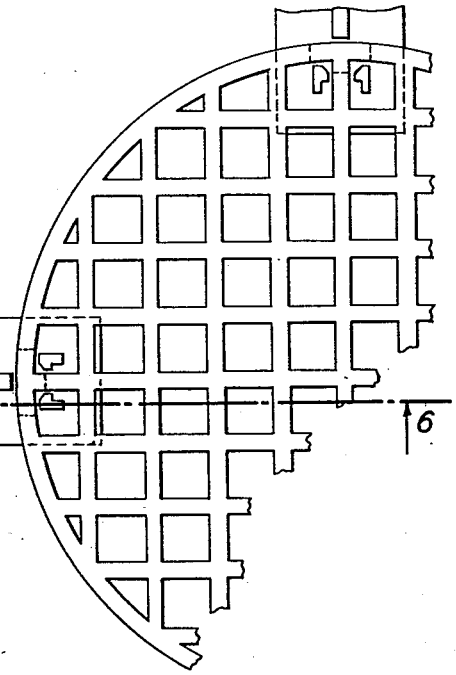
Figure 7 is a plan view, in part, of the center circular grid member.
Figure 17:
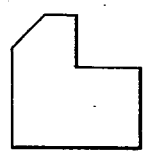
Figures 17 and 19 are plan views of expansion control lugs.
Figure 18:
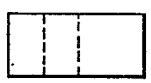
Figures 18 and 20 are elevational views of the expansion lugs of Figures 17 and 19, respectively.

On reference to Figure 1, it may be seen that there may be eight such expansion control lugs positioned on the ends of some of the long beams 35 to control expansive movements of the center circular grid member 32. The lug illustrated in Figures 17 and 18 is the one used to direct movement of this center grid and its specific orientation relative to the circular grid 32 is best shown in Figure 7.

Figure 19:
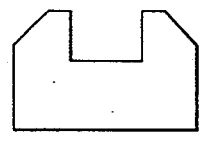
Figure 20:

The lug shown in Figures 19 and 20 is used to position and direct expansion of the intermediate grid members and the outer grid members. The detail identified by reference numeral 64 shows four lugs (of Figures 19 and 20) as fastened to a long beam 35. The two lugs included within the circle 65 are fastened to the end of a short beam 36. The two lugs 66 hold the inner end of an outer grid member 34 in a substantially fixed radial position and any radial expansion of this outer grid member will be toward the periphery of the chamber and contraction of course in the opposite direction. In like manner since an inner grid member 33 is fixed at lugs 67 expansion in this member will be in the direction of the "center" of the vessel, and contraction in the opposite direction. In this manner the outer grid plates 34 expand away and outward from the circle of bolts 37 while the inner or intermediate grid members expand away and inward from this circle of bolts 37.

In a similar manner the portions of the beams 35 and 36 outside the circle of bolts 37 expand toward the walls of the vessel while that portion of the beams inside the bolt circle expand in the direction of the center of the chamber. Thus the outer grids and the outer ends of the beams expand in the same direction, and the intermediate grids and inner ends of the beams expand also in the same direction, the latter expansion of course being opposite and equal to the former.

These said expansions and contractions relative to the bolt circle as just discussed are of course all radial. Since expansion is a cubic property of materials, these grids, etc., also expand vertically and circumferentially.

The circumferential expansion is appreciable. In the circle of intermediate grid plates 33, are as shown, sixteen expansion points. These expansion points may be best observed by reference to Figures 4 and 5. In Figure 4, specifically, are two grid plates, for example two intermediate plates (as plates shown in Figure 11) separated by spaces 59 and the top web member 51. When the grid member expands it occupies a portion of the space 59 and when it contracts space 59 merely becomes larger by receding of the rim member of grid 61 or 62. Thus the circumferential expansion and contraction are taken care of by the several expansion spaces 59.

In a similar manner, the circumferential expansion of the outer grid members is absorbed by spaces between the radial rims of the outer grids and the upper web members of the beams 35 and 36. This radial rim-beam web-space relationship is similar to that described above and may likewise be illustrated by the showing of Figure 4.

The vertical expansion of these metallic members is small as compared to the radial or circumferential expansions, yet, relative to the height of such a catalyst supporting structure, the vertical expansion is appreciable. However, we have found that the vertical expansion can be absorbed by the small space between the top of the screen 50 and the bottom of the plate 75, shown in Figure 21, which structure is disclosed and claimed in United States application Serial No. 691,865, filed August 20, 1946, by one of us. Upon reference to this figure, the expansion space is identified by numeral 92. In the sidewall of the chamber is a slot 73 which extends completely around the chamber. Into this slot extends the outer edge of the screen 50. A plate 74 upon which the bottom of the screen 50 rests when the chamber is at atmospheric temperature forms the floor or bottom of this slot while the plate 75 forms the top. The two plates are separated by a spacer bar 76. The lower plate 74 is anchored to the insulation below it by an anchor member 77. The upper plate member 75 is fastened to the spacer bar 76 which in turn rests upon the lower plate 74. The spacer bar thus serves as a separator between the lower and upper edges of the upper and lower plates, 75 and 74 respectively. The outer edges of these plates are separated during setting of the upper plate 75 by the thickness of the screen 50 plus the thickness of a removable spacer gauge, not shown. This spacer gauge merely provides sufficient thickness so that its thickness plus the thickness of the screen are equal to the thickness of the spacer bar 76. When the upper plate 75 is firmly fixed in place by setting and hardening of the insulation material, the spacer gauge may be removed. Thus a space is left above screen 50 to allow free room for the vertical movement of the screen due to the vertical expansion of the beam and grid assembly when the catalyst chamber is heated from atmospheric to process temperature. The distance between the edge of the screen 50 and the spacer bar 76 is sufficiently great to accommodate the linear expansion of the screen. Any degraded catalyst which sifts through the layer of ceramic balls, mentioned hereinafter, and through the screen 50 at a point intermediate the outer grid plates 34 and the circumferential upper plate 75 assembly will merely fall through the opening 68 between the grids 34 and the adjacent chamber walls to the floor of the vessel. We have found that degraded catalyst does not under normal operating conditions find its way into the space 73.

These lower and upper plates 74 and 75, respectively may be rectangular in shape or may have their long edges circular arcs, or one edge a circular arc to conform to the circumference of the chamber at their point of assembly.

Figure 21:
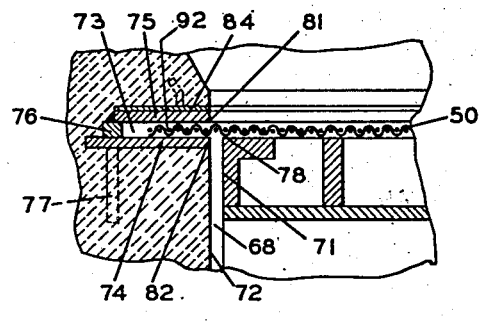
Figure 21 is a cross sectional view of the "Detail 21" of Figure 2.

With the edge of the screen 50 inserted in the wall slot as shown in Figure 21, the screen is free to expand and contract as chamber temperature increases or decreases.

When the beam and grid structure expands upward as evidenced by an upward movement of the outer circumferential edge 78 of the outer grid plates, the screen 50 will accordingly rise and its outer edge may touch the under side of the upper plates 75, or the grid screen might rise even more than that permissible by the height of the opening 73, in which case the screen will merely bend at point 81. In a similar manner when the beam and grid assembly cools, and the chamber is filled with catalyst, the weight of the catalyst may cause a downward bending of the screen at point 82. While at points 81 and 82, the screen may bend upward or downward, we have found that the bending is very little indeed, since the screen moves upward and downward only about ⅛ inch during heating from atmospheric to catalytic conversion temperatures and cooling to atmospheric temperature again and this movement is intended to be absorbed by the space 92 shown in Figure 21.

Figures 6 and 7 merely show one type of center circular grid construction. Figures 8, 9, 10, 11 and 12 show one type of construction of the intermediate grid members, while Figures 13, 14, 15 and 16 show one type of grid construction for the outer circular grid members. It will be obvious to those skilled in such art that the particular design, the square or nearly rectangular shaped grid openings may be varied to suit a specific set of conditions. In like manner, the overall shape of the various grid sections may be varied to suit particular conditions, as well as the under side grid construction.

In addition, while some details of the beam construction may be altered, the beams must have openings 53 (Figure 5) for disposal of catalyst siftings.

In the installation of our catalyst support assembly, the main part of the insulation, such as insulcrete is put into place, the anchors 43 with the beam support plates 41 and 42 and 44 and the main anchor bolts 37 are inserted. The long and short beams 35 and 36 may then be bolted into place. Prior to installation of the long beams 35, a funnel shaped alloy outlet duct 83 is inserted (Figure 2). This funnel shaped member, however, is quite independent from the catalyst support mechanism and forms no part of our invention.

After the beams are set in place, the gratings are placed in position. Each section is carefully set so that clearance between the grating section edges and the top web members of the beams have proper spaces 59 for absorbing circumferential grating expansion. In like manner, the intermediate grids are carefully adjusted in place with proper spacing between the sections 33 and the inner circular member. The outer grids 34 are then placed in proper relation to each other and to the adjacent intermediate grids 33. When all grids are in proper position, the lugs of Figures 17 and 18 are placed on the ends of the long beams 35 in the proper openings of the center grid plates. The lug positions are marked, then the center grid removed and the lugs are fastened in place. The center grid is then replaced. In a similar manner, the lugs of Figures 19 and 20 are positioned on the beams 35 and 36 through the proper openings in the grids 33 and 34 and each position carefully marked. These plates are then removed, the lugs fastened to the beams and the grids replaced.

The screen expansion slot in the chamber sidewall may then be prepared. The series of lower rectangular plates 74 are positioned by means of the anchor members 77. Each anchor 77 and bottom plate 74 are grouted into position. From Figure 1 it may be seen that there are numerous individual plates 74 to be placed to make an approximately circular base plate for a bearing support for the outer edge of the screen 50, this support ultimately to be within the side wall insulation.

The screen 50 being woven of relatively heavy gage grid wire is quite rigid and hence cannot be easily flexed or bent and therefore must be laid in place prior to the installation of the upper plate members 75 and spacer bars 76 and the insulation above these plates. With the screen 50 positioned the upper plates 75 and spacer bars 76 are laid with spacer bar 76 resting on lower plates 74 and the front side properly spaced from the screen by the spacer, mentioned hereinbefore, at point 81. This spacer may be of such thickness that its thickness plus the thickness of the screen equals the thickness of the spacer bar 76. Then with the upper plates 75 in position some small plates 84 are placed to cover any openings between the ends of successive plates 75 so that insulation cannot find its way to the screen.

With plates 75 properly placed with respect to each other and spaced from the screen 50 and with small plates 84 positioned, insulation is added to the top of this plate 75—84 assembly to fill in as shown at 85 in Figure 2. When this fill in insulation is set and hardened the spacer between the screen 50 and plates 75 are removed.

To serve as a protection to the large circular bed screen 50 we prefer to place upon this circular screen another screen. The installation of this auxiliary screen may not be so critical and accordingly we fit segments of a 4 mesh by 4 mesh wire screen on the main screen and lace them together with wire.

Upon this screen assembly we may place a layer of about ½ inch diameter refractory pebbles to a depth of 3 inches or so. On these pebbles is placed a 4 to 6 inch layer of smaller refractory pebbles, such as $\tfrac{3}{16}$ inch and/or $\tfrac{1}{16}$ inch. Then upon these smaller pebbles may be placed the process catalyst, the chamber being filled to any desired level, the chamber headed up, inlet and outlet connections made and other connections as desired when the vessel is ready for service.

The insulation material may be on insulation cement, such as insulcrete or any other material of satisfactory composition and properties. The insulation material may be moulded or cast in forms or installed by spraying from a pressure gun or by any other suitable method.

The metal pieces, that is, the bearing plates and their anchors, the beams, the grid plates and the screens should be of a material which will withstand high temperature conversion conditions, combustive regeneration, and not deteriorate by oxidation or other corrosion. The metal members must possess sufficient mechanical strength to support a heavy catalyst load at conversion and regeneration temperatures as well as at atmospheric temperature. High chromium-nickel steels have been found to be satisfactory for use as herein described. Other alloys suitable for the problem at hand and possessing satisfactory properties may of course be used. We have found that such high chromium stainless alloy steel as A. I. S. I. (American Institute of Steel and Iron) Type 316, 321 or 347 are suitable for the anchor bolts and bearing plates, and for the woven screen (50). The beams and grating sections may be made of A. S. T. M. (American Society for Testing Materials), A-222-39, Class A high chromium steel, with composition balanced to assure a stable austenitic alloy.

The particular design of the beams and of the grating sections are not intended to be limited to the specific designs illustrated in the drawing and described herein, since they are given merely as examples. However, the beams must have open spaces 53 or equivalent means for disposal of catalyst siftings which might accumulate in spaces normally taken up by expansion of the metal members. The grid plates as described possess sufficient strength to support heavy catalyst loads, but other designs adapted to give sufficient strength, may of course be used.

It will be obvious to those skilled in the art that many variations and modifications of our catalyst support may be made and yet remain within the intended spirit and scope of our invention.

Having disclosed our invention, we claim:

1. A contact chamber comprising in combination a vertically disposed closed outer shell having a fluid inlet in one of its ends and a fluid outlet in its other end; an insulation lining provided within said shell; a plurality of support arms horizontally disposed in the bottom portion of a chamber formed within said shell and having their axes disposed radially with respect to the vertical axis of said chamber, each arm being rigidly secured to the floor of said chamber only at a point intermediate the ends of said arm; and at least one perforate grid assembly supported on said arms, the perforations in said grid being sized so as to permit passage therethrough of reactant fluid but to prevent the passage therethrough of catalyst utilized in said chamber.

2. A contacting vessel adapted to promote contacting of a reactant fluid with a solid contact material, comprising in combination a substantially vertically disposed closed shell, said shell having a fluid inlet in one of its ends and a fluid outlet in its other end; an insulation lining within said shell; a plurality of beam members disposed horizontally in the bottom portion of the chamber within said vessel and having their longitudinal axes disposed radially with respect to the vertical axis of said shell, each said beam being rigidly fixed to the bottom of said chamber only at a point intermediate its ends, said point being substantially equi-distant between the vertical axis and circumference of said shell; and a perforate expansible gridwork support assembly supported by said beams, said perforations being sized so as to allow passage of reactant material therethrough and substantially prevent the passage therethrough of catalyst material utilized in said chamber.

3. The contacting vessel of claim 2, wherein said plurality of beams comprises alternately disposed long and short beams, said short beams being rigidly fixed adjacent their inner ends and extending outwardly to a point adjoining the circumference of said chamber.

4. The contacting vessel of claim 2, wherein each of said beams comprises a horizontally disposed base flange member; a vertical web member rigidly affixed to the upper surface of said base flange member; a horizontally disposed upper flange member rigidly affixed to the upper edge of said vertical web member; and a vertically disposed top web member rigidly affixed to the upper surface of said upper flange member.

5. The contacting vessel of claim 4, wherein said top web members are of such height that they terminate in a horizontal plane substantially coinciding with the top surface of said perforate gridwork support assembly.

6. The contacting vessel of claim 2, wherein each of said beams comprises a horizontally disposed base flange; a first vertical web member rigidly affixed to the upper surface of said base flange member, said first web member having indentations in its upper edge; a horizontally disposed perforate upper flange rigidly affixed to the upper edge of said first vertical web member, said perforations coinciding with said indentations in the upper edge of said first vertical web member; and a vertically disposed top web member rigidly affixed to the top surface of said perforate upper flange and in vertical alignment with said first vertical web member, said top web member having indentations provided in its lower edge, which indentations coincide with said perforations in said perforate upper flange, whereby continuous passageways are provided from points above said upper flange member through said upper flange member to points below said upper flange member.

7. A contacting vessel adapted to promote contacting of a reactant fluid with a solid contact material, comprising in combination a substantially vertically disposed closed shell, said shell having a fluid inlet in one of its ends and a fluid outlet in its other end; an insulation lining within said shell; a plurality of beam members disposed horizontally on the bottom insulation lining of said vessel and having their longitudinal axes disposed radially with respect to the vertical axis of said shell, each said beam being rigidly fixed to the bottom of the chamber within said shell only at a point intermediate its ends, said point being substantially equi-distant between the vertical axis and circumference of said shell; a perforate expansible grid assembly supported by said beam members; and a screen assembly covering said grid assembly, the mesh of said screen assembly being such as to allow the flow of said reactant fluid therethrough and substantially prevent passage therethrough of said solid contact material utilized in said chamber.

8. The contacting vessel of claim 7, wherein said screen assembly is covered by a layer of sized ceramic pebbles, thereby forming a filter means so as to separate said solid contact material from said reactant fluid.

9. The contacting vessel of claim 7, wherein the periphery of said perforate screen assembly is expansibly retained within said insulation lining.

10. The contacting vessel of claim 7, wherein a recess is formed in said insulation lining adjacent the periphery of the upper edge of said gridwork assembly, said recess being formed by an annular shaped bottom plate embedded in the sidewall insulation of said vessel and an annular shaped upper plate also embedded in said sidewall insulation, said plates being spaced apart by a spacer means; and the periphery of said screen assembly being slidably retained in said recess.

11. A contacting vessel adapted to promote contacting of a reactant fluid with a solid contact material, comprising in combination a substantially vertical disposed closed shell, said shell having a fluid inlet in one of its ends and a fluid outlet in its other end; an insulation lining within said shell; a plurality of beam members disposed horizontally on the bottom insulation lining of said vessel and having their longitudinal axes disposed radially with respect to the vertical axis of said shell, each said beam being rigidly fixed to the bottom of said chamber only at a point intermediate its ends, said point being substantially equi-distant between the vertical axis and circumference of said shell, each said beam comprising a horizontally disposed base flange, a first vertical web member rigidly affixed to the upper surface of said base flange member and having indentations in its upper edge, a horizontally disposed perforate upper flange rigidly affixed to the upper edge of said first vertical web member so that said perforations coincide with said indentations in said web member, and a top web member having indentations in its lower edge rigidly and vertically affixed to said perforate upper flange so as to be in vertical alignment with said first web member and so that the indentations in its lower edge coincide with said perforations in said upper flange, thereby providing continuous passageways from points above said upper flange member through said upper flange member to points below said upper flange member; a plurality of perforate grid members, having radial rims with indentations in their lower edges, supported by said radial rims on said upper flange member of said beams, adjacent grid members being separated by said top web member of said beams; and a screen assembly covering said grid members and adjacent individual sections of said screen assembly being separated by said top web members of said beams, the mesh of said screen of said assembly being of such size as to allow the flow of said reactant fluid therethrough and substantially prevent passage therethrough of said solid contact material utilized in said chamber.

12. The contacting vessel of claim 11, wherein said indentations in the lower edges of said radial rims are disposed intermediate said passageways through said upper flanges of said beams, whereby additional exits are provided for contact material fines from the space between said top web members and said radial rims.

BURLE F. WOBKER.
EARL L. SLOAN.
PRESTON P. BRIGGS.

REFERENCES CITED

The following references are of record in the file of this patent:

UNITED STATES PATENTS

| Number | Name | Date |
|---|---|---|
| 2,330,068 | Marancik et al. | Sept. 21, 1943 |
| 2,399,560 | Murphree | Apr. 30, 1946 |
| 2,414,816 | Kleiber et al. | Jan. 28, 1947 |